US011095335B2

(12) United States Patent
Sundström et al.

(10) Patent No.: US 11,095,335 B2
(45) Date of Patent: Aug. 17, 2021

(54) TRANSCIEVER CIRCUIT

(71) Applicant: Telefonaktiebolaget LM Ericsson (publ), Stockholm (SE)

(72) Inventors: Lars Sundström, Södra Sandby (SE); Staffan Ek, Lund (SE); Christian Elgaard, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/625,051

(22) PCT Filed: Jun. 22, 2017

(86) PCT No.: PCT/EP2017/065430
§ 371 (c)(1),
(2) Date: Dec. 20, 2019

(87) PCT Pub. No.: WO2018/233836
PCT Pub. Date: Dec. 27, 2018

(65) Prior Publication Data
US 2020/0145041 A1 May 7, 2020

(51) Int. Cl.
*H04B 1/40* (2015.01)
*H04B 1/408* (2015.01)
(Continued)

(52) U.S. Cl.
CPC .......... *H04B 1/408* (2013.01); *H04B 1/005* (2013.01); *H04B 1/04* (2013.01); *H04B 15/06* (2013.01); *H04B 2001/0491* (2013.01)

(58) Field of Classification Search
CPC .......... H04B 1/408; H04B 1/005; H04B 1/04; H04B 15/06; H04B 2001/0491
(Continued)

(56) References Cited

U.S. PATENT DOCUMENTS

2010/0112943 A1* 5/2010 Chia .................. H01Q 3/42
455/41.2
2010/0225367 A1 9/2010 Murali et al.
(Continued)

FOREIGN PATENT DOCUMENTS

WO 2015038381 A1 3/2015
WO 2015162055 A1 10/2015
WO 2015175136 A1 11/2015

OTHER PUBLICATIONS

International Search Report and Written Opinion of the International Searching Authority dated Dec. 3, 2018 issued in PCT Application No. PCT/EP2017/065430, consisting of 10 pages.

*Primary Examiner* — Kevin M Burd
(74) *Attorney, Agent, or Firm* — Christopher & Weisberg, P.A.

(57) ABSTRACT

An integrated circuit is disclosed. The integrated circuit includes a set of transceivers comprising a plurality of transceivers, all configured to transmit in the same transmit frequency band and receive in the same receive frequency band. Furthermore, the integrated circuit has a set of frequency synthesizers including a separate frequency synthesizer associated with each transceiver in the set of transceivers, wherein each frequency synthesizer in the set is configured to generate a local-oscillator (LO) signal to its associated transceiver. Moreover, the integrated circuit includes a control circuit configured to control the set of frequency synthesizers such that nearest neighbors in the set of frequency synthesizers generate LO signals at different frequencies ($f_1$, $f_2$, $f_3$, $f_4$).

17 Claims, 3 Drawing Sheets

(51) Int. Cl.
    *H04B 1/00*     (2006.01)
    *H04B 1/04*     (2006.01)
    *H04B 15/06*    (2006.01)
(58) Field of Classification Search
    USPC .......................................................... 375/219
    See application file for complete search history.

(56) References Cited

U.S. PATENT DOCUMENTS

2013/0230080 A1    9/2013  Gudem et al.
2017/0302342 A1*  10/2017  Kurchuk .............. H04B 7/0452

* cited by examiner

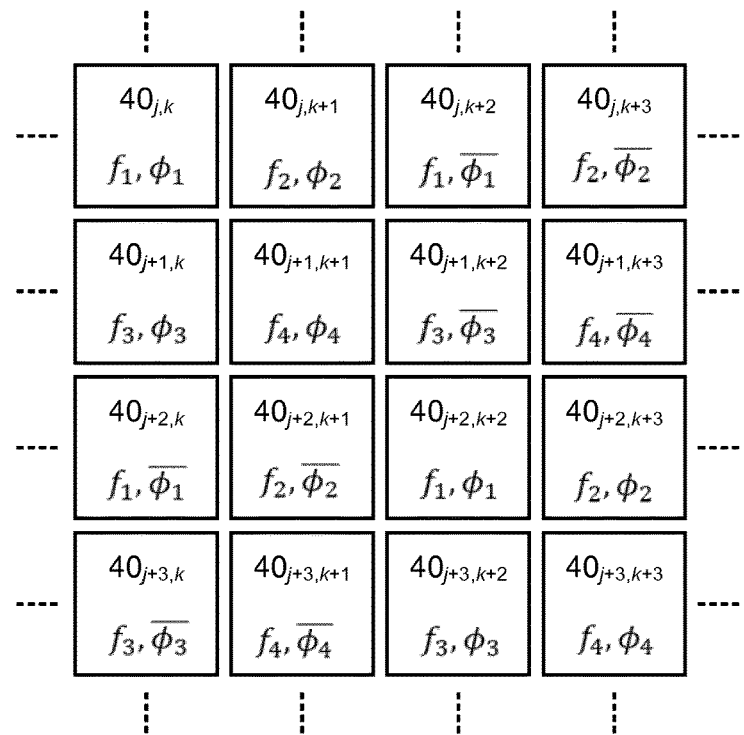
Fig. 7
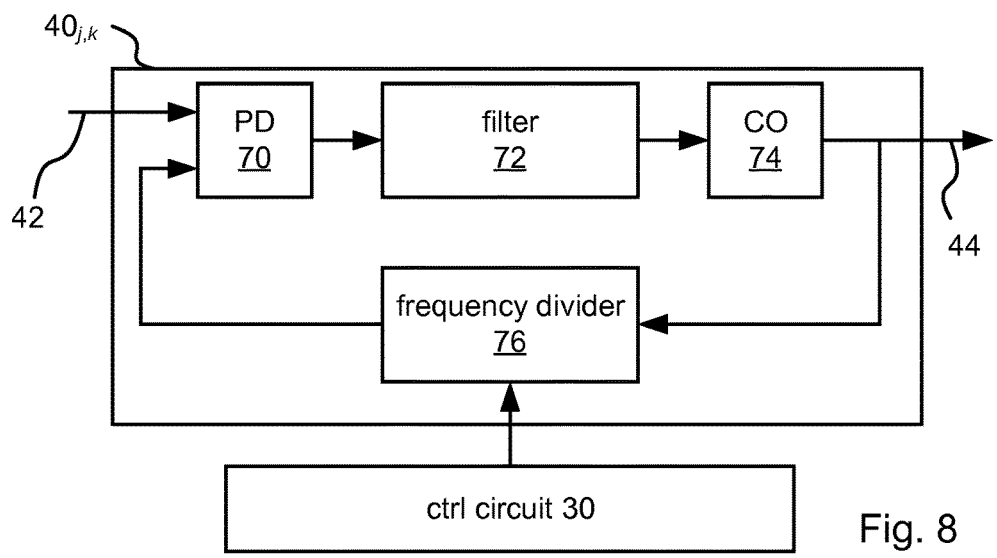
Fig. 8
control frequency synthesizers such that nearest neighbors generate LO signals at different frequencies
100
Fig. 9 ns
TRANSCIEVER CIRCUIT

CROSS-REFERENCE TO RELATED APPLICATIONS

This application is a Submission Under 35 U.S.C. § 371 for U.S. National Stage Patent Application of International Application Number: PCT/EP2017/065430, filed Jun. 22, 2017 entitled "TRANSCEIVER CIRCUIT," the entirety of which is incorporated herein by reference.

TECHNICAL FIELD

The present invention relates to a transceiver circuit with multiple transceivers.

BACKGROUND

In, for example, fifth generation (5G) communications systems, array antenna systems can be used for efficient transmission and reception with relatively high degree of capacity and coverage. Such an array antenna system typically comprises a number of equally spaced antenna elements, each connected to its own associated transceiver.

Local oscillator (LO) signals used for up and down conversion of signal between RF and baseband contribute to the phase noise of received and transmitted signals. Furthermore, clock-signal distribution of an LO signal to all transceivers in an array antenna system may result in a relatively high energy consumption, especially at relatively high LO signal frequencies. It may therefore be beneficial to use a distributed LO signal generation, where LO signals are generated locally for each transceiver, or for a group of collocated transceivers, rather than having a common, centrally generated LO signal shared by all transceivers. By generating the LO signals locally, the energy consumption due to high-frequency LO signal distribution can be reduced. Furthermore, the phase-noise correlation between different transceivers can also be reduced, resulting in a reduced overall impact of the phase noise for the whole array antenna system.

SUMMARY

While the distributed LO signal generation is attractive in many regards, the inventors have realized that each frequency synthesizer will have its own controllable oscillator (CO), and there will be a mutual coupling between these COs, for instance through inductive coupling between resonant tanks in the COs. This could, for instance, lead to unstable behavior of the frequency synthesizers. Embodiments disclosed herein aim at reducing detrimental effects of coupling between frequency synthesizers.

According to a first aspect, there is provided an integrated circuit. The integrated circuit comprises a set of transceivers comprising a plurality of transceivers, all configured to transmit in the same transmit frequency band and receive in the same receive frequency band. Furthermore, the integrated circuit comprises a set of frequency synthesizers, comprising a separate frequency synthesizer associated with each transceiver in the set of transceivers, wherein each frequency synthesizer in said set is configured to generate a local-oscillator signal to its associated transceiver. Moreover, the integrated circuit comprises a control circuit configured to control the set of frequency synthesizers such that nearest neighbors in the set of frequency synthesizers generate LO signals at different frequencies.

The control circuit may be configured to control the frequency synthesizers such that, in a subset of the frequency synthesizers, which are controlled to generate LO signals at the same frequency and which are all nearest neighbors of a same other frequency synthesizer, half of the frequency synthesizers are controlled to generate LO signals with a first phase, and the other half of the frequency synthesizers are controlled to generate LO signals with a second phase, opposite to the first phase.

The control circuit may be configured to control the frequency synthesizers in the set of frequency synthesizers such that every other frequency synthesizer is controlled to generate an LO signal at a first frequency and each of the other frequency synthesizers is controlled to generate an LO signal at a second frequency, different from the first frequency.

In some embodiments, each frequency synthesizer in said set is a phase-locked loop. Each phase-locked loop in said set may have a controllable frequency divider in a feed-back path, and the control circuit may be configured to control said controllable frequency divider.

In some embodiments, each transceiver in the set of transceivers comprises a mixer configured to downconvert a received signal with the LO signal generated by the frequency synthesizer associated with the transceiver.

In some embodiments, each transceiver in the set of transceivers comprises a mixer configured to upconvert a signal to be transmitted with the LO signal generated by the frequency synthesizer associated with the transceiver.

According to a second aspect, there is provided a communication apparatus comprising the integrated circuit of any preceding claim and a multi-antenna arrangement comprising a separate antenna element associated with and connected to each transceiver in the set of transceivers.

The communication apparatus may be configured to perform beamforming communication via the multi-antenna arrangement.

The communication apparatus may be a radio base station or a wireless communication device for a cellular communications system.

According to a third aspect, there is provided a method of controlling an integrated circuit. The integrated circuit comprises a set of transceivers comprising a plurality of transceivers, all configured to transmit in the same transmit frequency band and receive in the same receive frequency band, and a set of frequency synthesizers, comprising a separate frequency synthesizer associated with each transceiver in the set of transceivers, wherein each frequency synthesizer in said set is configured to generate an LO signal to its associated transceiver. The method comprises controlling the set of frequency synthesizers such that nearest neighbors in the set of frequency synthesizers generate LO signals at different frequencies.

Controlling the set of frequency synthesizers may comprise, for a subset of the frequency synthesizers, which are controlled to generate LO signals at the same frequency and which are all nearest neighbors of a same other frequency synthesizer, controlling half of the frequency synthesizers of the subset to generate LO signals with a first phase, and controlling the other half of the frequency synthesizers of the subset to generate LO signals with a second phase, opposite to the first phase.

Controlling the set of frequency synthesizers may comprise controlling every other frequency synthesizer in the set of frequency synthesizers to generate an LO signal at a first frequency, and controlling each of the other frequency synthesizers ($40_{j,k}$) in the set of frequency synthesizers to generate an LO signal at a second frequency, different from the first frequency.

Further embodiments are defined in the dependent claims. It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

FIGS. 4-7 illustrate arrays of frequency synthesizers according to embodiments.

FIG. 8 illustrates a phase-locked loop and a control circuit according to an embodiment.

FIG. 9 illustrates a method according to an embodiment.

DETAILED DESCRIPTION

Figure 1:
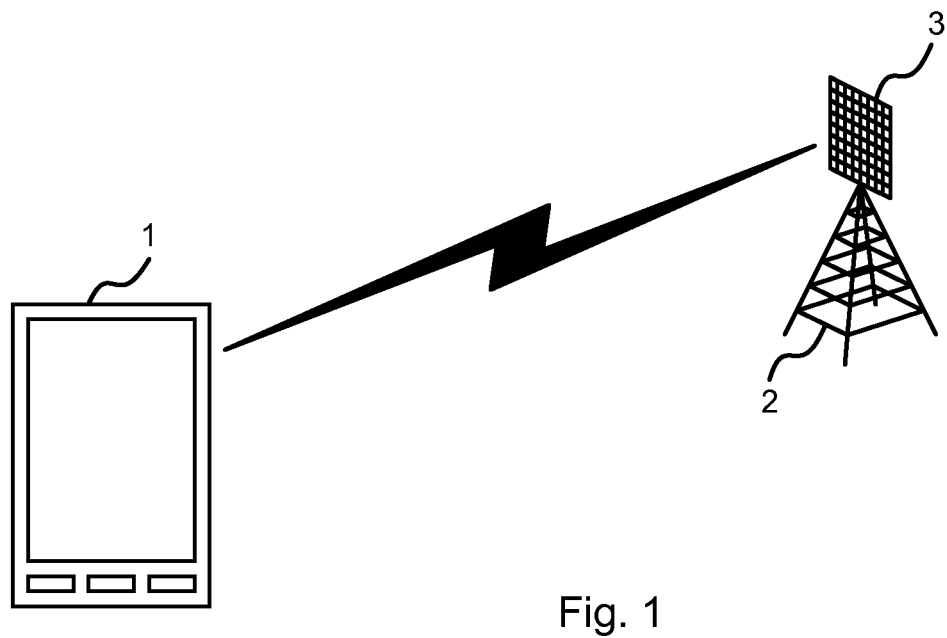
FIG. 1 illustrates a communication environment.

FIG. 1 illustrates a communication environment wherein embodiments of the present invention may be employed. A wireless communication device 1, or wireless device 1 for short, of a cellular communications system is in wireless communication with a radio base station 2 of the cellular communications system. The wireless device 1 may be what is generally referred to as a user equipment (UE). The wireless devices 1 is depicted in FIG. 1 as a mobile phone, but may be any kind of device with cellular communication capabilities, such as a tablet or laptop computer, machine-type communication (MTC) device, or similar. Furthermore, a cellular communications system is used as an example throughout this disclosure. However, embodiments of the present invention may be applicable in other types of systems as well, such as but not limited to WiFi systems.

The radio base station 2 and wireless device 1 are examples of what in this disclosure is generically referred to as communication apparatuses. Embodiments are described below in the context of a communication apparatus in the form of the radio base station 2 or wireless device 1. However, other types of communication apparatuses can be considered as well, such as a WiFi access point or WiFi enabled device.

In FIG. 1, the radio base station 2 comprises a multi-antenna arrangement 3, such as an antenna array, comprising a plurality of antenna elements. The radio base station may be configured to transmit signals in the same transmit frequency band via all antenna elements using the same transmit frequency. Alternatively or additionally, the radio base station may be configured to receive signals in the same receive frequency band via all antenna elements using the same receive frequency. In some embodiments, said receive frequency is equal to said transmit frequency. In other embodiments, said receive frequency is different from said transmit frequency. Examples of such multi-antenna communication in the same frequency band for all antenna elements include multiple-input multiple-output (MIMO) communication, massive MIMO, multi-user MIMO (MU-MIMO), and beamforming. This is notably different from communication that uses different frequency bands for different antenna elements, for instance so called carrier aggregation. Even though not explicitly shown in FIG. 1, the wireless device 1 may also comprise such a multi-antenna arrangement.

Figure 2:
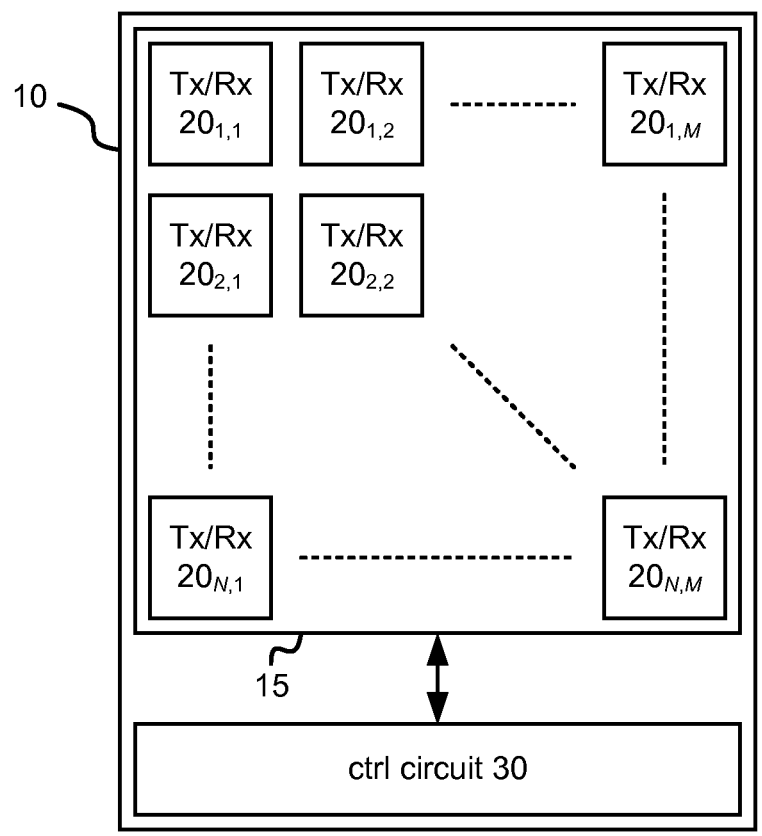
FIG. 2 illustrates an integrated circuit according to an embodiment.

FIG. 2 illustrates an integrated circuit (IC) 10, which may be comprised in the radio base station 2 or wireless device 1. It comprises a set of transceivers 15. The set 15 comprises a plurality of transceivers $20_{j,k}$, all configured to transmit in the same transmit frequency band and/or receive in the same receive frequency band. In FIG. 2, the transceivers $20_{j,k}$ are arranged in a two-dimensional array with N rows and M columns, where the first index (j) indicates a row and the second index (k) indicates a column, but other arrangements are possible as well. It should be noted that, in this disclosure and the accompanying figures, j and k are sometimes used as generic index variables (as above) and sometimes as specific values of such index variables (e.g. as in FIGS. 5-7). For instance, with reference to FIG. 1, the multi-antenna arrangement 3 may comprise a separate antenna element associated with and connected to each transceiver $20_{j,k}$ in the set of transceivers 15. Each transceiver $20_{j,k}$ may be configured to transmit and receive signals via its associated antenna element in the multi-antenna arrangement.

In FIG. 2, the IC further comprises a control circuit 30, the function of which is further described below.

In some embodiments, the set 15 includes all transceivers on the IC 10. In other embodiments, the IC 10 includes additional transceivers (not shown) in addition to those in the set 15. Hence, in these embodiments, the set 15 is a subset of the set of all transceivers on the IC 10.

Figure 3:
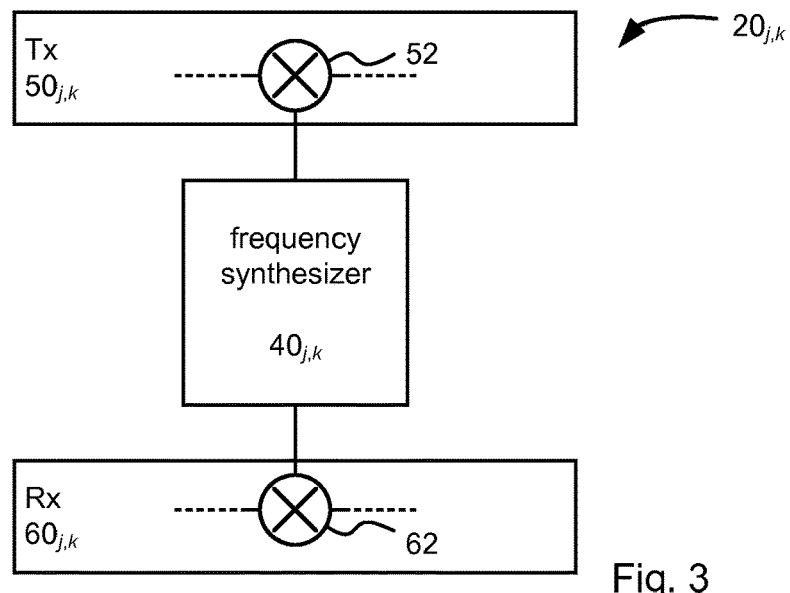
FIG. 3 illustrates a transceiver according to an embodiment.

As illustrated in FIG. 3, there is a separate frequency synthesizer $40_{j,k}$ associated with each transceiver $20_{j,k}$ in the set of transceivers 15. Thus, the IC 10 comprises a set of frequency synthesizers $40_{j,k}$, comprising a separate frequency synthesizer $40_{j,k}$ associated with each transceiver $20_{j,k}$ in the set of transceivers 15. For simplicity, the same indexing is used for the frequency synthesizers $40_{j,k}$ as for the transceivers $20_{j,k}$. Thus, for given values of j and k, the frequency synthesizer associated with the transceiver $20_{j,k}$ is denoted $40_{j,k}$. In FIG. 3, the frequency synthesizer $40_{j,k}$ is illustrated as being comprised in the transceiver $20_{j,k}$. However, in some embodiments, the frequency synthesizer $40_{j,k}$ external to the transceiver $20_{j,k}$. Each frequency synthesizer $40_{j,k}$ in said set is configured to generate a local-oscillator (LO) signal to its associated transceiver $20_{j,k}$. For example, as illustrated in each transceiver $20_{j,k}$ in the set of transceivers 15 may comprise a mixer 62 configured to downconvert a received signal with the LO signal generated by the frequency synthesizer $40_{j,k}$ associated with the transceiver $20_{j,k}$. The mixer 62 may e.g. be comprised in a receive (Rx) part $60_{j,k}$ of the transceiver $20_{j,k}$. Alternatively or additionally, each transceiver $20_{j,k}$ in the set of transceivers 15 may comprise a mixer 52 configured to upconvert a signal to be transmitted with the LO signal generated by the frequency synthesizer $40_{j,k}$ associated with the transceiver $20_{j,k}$. The mixer 52 may e.g. be comprised in a transmit (Rx) part $50_{j,k}$ of the transceiver $20_{j,k}$.

The inventors have realized that, while the distributed LO generation, using a dedicated frequency synthesizer per transceiver, is attractive in many regards, each frequency synthesizer will have its own controlled oscillator (CO) and the different COs (and possibly other parts of the frequency synthesizers) will be mutually coupled. Such coupling may for example be primarily through inductive coupling between resonant tanks in the COs. This effectively leads to interaction between the frequency synthesizers that in turn may lead to unstable behavior that also depend on the phase relations between the coupled COs. In other words, as the COs operate at the same frequency, a perturbation in one frequency synthesizer ("aggressor") will be effectively picked up by a another frequency synthesizer ("victim") as it appears inside the loop bandwidth. This problem is most severe for frequency synthesizers that are located in close physical proximity to each other. The inventors have further realized that the problem can be reduced by operating frequency synthesizers that are located in close physical proximity to each other at different frequencies. Therefore, in accordance with embodiments of the present invention, the control circuit 30 is configured to control the set of frequency synthesizers such that nearest neighbors in the set of frequency synthesizers generate LO signals at different frequencies. The term nearest neighbor, when used herein, should be interpreted in terms of physical distance.

Some examples of embodiments are illustrated in FIGS. 4-7. These figures are intended to reflect the relative physical placement of frequency synthesizers on the IC 10 according to these examples.

Figure 4:
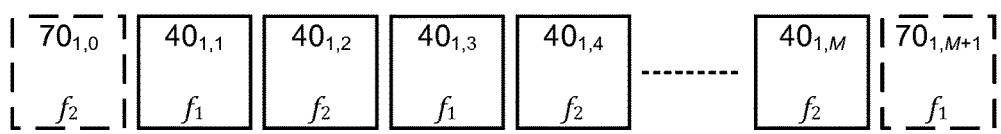

An example of this is concept is illustrated in FIG. 4, where the frequency synthesizers $40_{j,k}$ are placed in a one-dimensional array, e.g. a single row. Since a single row is considered, the index j=1 for all frequency synthesizers in FIG. 4. Each box in FIG. 4 represents a frequency synthesizer, and the $f_1$ or $f_2$ in the boxes represents the frequency of the generated LO signal. For odd values of k, the frequency synthesizer $40_{1,k}$ is controlled to generate an LO signal at the frequency $f_1$. For even values of k, the frequency synthesizer $40_{1,k}$ is controlled to generate an LO signal at the frequency $f_2$.

The embodiment illustrated in FIG. 4 is an example wherein the control circuit 30 is configured to control the frequency synthesizers $40_{j,k}$ in the set of frequency synthesizers such that every other frequency synthesizer $40_{j,k}$ is controlled to generate an LO signal at a first frequency $f_1$ and each of the other frequency synthesizers $40_{j,k}$ is controlled to generate an LO signal at a second frequency $f_2$, different from the first frequency $f_1$. Other such examples are presented with reference to FIGS. 5 and 6.

FIG. 4 also illustrates a further concept of some embodiments. Optionally, "dummy" frequency synthesizers labeled $70_{1,0}$ and $70_{1,M+1}$ in FIG. 4, that are not used in any transceivers, may be added to the edges of the array in order to ensure that all the frequency synthesizers $40_{j,k}$ have the same surroundings. This may be particularly useful in embodiments where different phases are used to cancel out interference from "aggressor" frequency synthesizers operating at the same LO frequency. Such embodiments are further described below.

Figure 5:
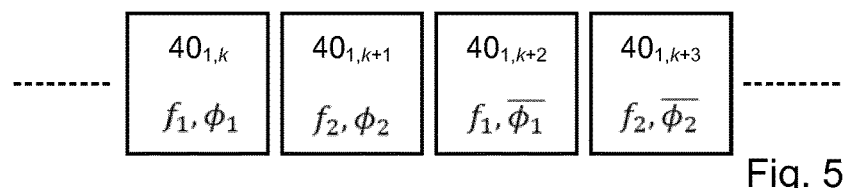

FIG. 5 illustrates an example where the control circuit 30 is configured to control the frequency synthesizers $40_{1,k}$ such that in a subset of the frequency synthesizers ("aggressors"), which are controlled to generate LO signals at the same frequency and which are all nearest neighbors of a same other frequency synthesizer ("victim"), half of the frequency synthesizers are controlled to generate LO signals with a first phase, and the other half of the frequency synthesizers are controlled to generate LO signals with a second phase, opposite to the first phase. Opposite phase, in this context, means that the phase difference between LO signals is substantially 180 degrees. Ideally, exactly 180 degrees would be desirable, but is not attainable in practice. FIG. 5 illustrates part of a one dimensional array of frequency synthesizers. Consider for example synthesizers $40_{1,k}$ and $40_{1,k+2}$. They form a subset, that are both controlled to generate LO signals at the same frequency, namely $f_1$ and which are all nearest neighbors of a same other frequency synthesizer, namely $40_{1,k+1}$. Furthermore, the frequency synthesizer $40_{1,k}$, which is "half of them", is controlled to generate an LO signal with a first phase $\phi_1$, and the frequency synthesizer $40_{1,k+2}$, which is "the other half", is controlled to generate an LO signal with the opposite phase $\overline{\phi_1}$. From the perspective of the "victim" frequency synthesizer $40_{1,k+1}$, a coupled disturbance, or coupled interference, from the "aggressor" frequency synthesizer $40_{1,k}$ is substantially canceled by a corresponding coupled interference, with opposite phase, from the other "aggressor" $40_{1,k+1}$ (and vice versa).

Similarly, consider, as another example, synthesizers $40_{1,k+1}$ and $40_{1,k+3}$. They form a subset, that are both controlled to generate LO signals at the same frequency, namely $f_2$ and which are all nearest neighbors of a same other frequency synthesizer, namely $40_{1,k+2}$. Furthermore, the frequency synthesizer $40_{1,k+1}$, which is "half of them", is controlled to generate an LO signal with a first phase $\phi_2$, and the frequency synthesizer $40_{1,k+3}$, which is "the other half", is controlled to generate an LO signal with the opposite phase $\overline{\phi_2}$. From the perspective of the "victim" frequency synthesizer $40_{1,k+2}$, a coupled interference from the "aggressor" frequency synthesizer $40_{1,k+1}$ is substantially canceled by a corresponding coupled interference, with opposite phase, from the other "aggressor" $40_{1,k+3}$ (and vice versa).

Figure 6:
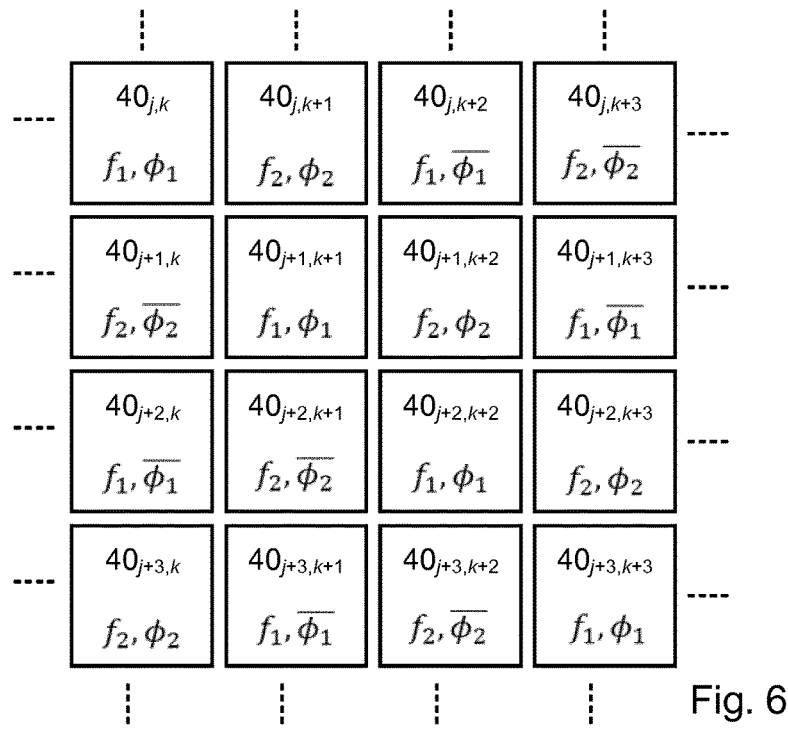

FIG. 6 illustrates another example where LO signals of the same frequency but opposite phases are used in the above-mentioned subsets in order for coupled interference to substantially cancel at the "victim" frequency synthesizer in the same way as described above. In FIG. 6, the frequency synthesizers $40_{j,k}$ are arranged in a two-dimensional array. Consider, for example the frequency synthesizers $40_{j,k+1}$, $40_{j+1,k}$, $40_{j+2,k+1}$, $40_{j+1,k+2}$. They form a subset of frequency synthesizers that are controlled to generate LO signals at the same frequency, namely $f_2$ and which are all nearest neighbors of a same other frequency synthesizer, namely $40_{j+1,k+1}$. Furthermore, half of them, namely $40_{j,k+1}$, $40_{j+1,k+3}$, are controlled to generate LO signals with a first phase $\phi_{2,}$ and the other half of them, namely $40_{j+1,k}$, $40_{j+2,k+1}$, are controlled to generate LO signals with a second phase $\overline{\phi_2}$, opposite to the first phase $\phi_2$. From the perspective of the "victim" frequency synthesizer $40_{j+1,k+1}$, coupled interference from the "aggressor" frequency synthesizers $40_{j,k+1}$, $40_{j+1,k+2}$ are substantially canceled by corresponding coupled interference, with opposite phase, from the other "aggressors" $40_{j+1,k}$, $40_{j+2,k+1}$ (and vice versa). Similar reasoning holds for other such subsets of frequency synthesizers.

It can be noted in this two-dimensional example that the nearest neighbors of a given frequency synthesizer, which are the adjacent frequency synthesizers in the same row or the same column as the given frequency synthesizer, are all controlled to generate LO signals at a different frequency than the given frequency synthesizers. The adjacent frequency synthesizers on the same diagonal as the given frequency synthesizer are, in the example of FIG. 6, controlled to generate LO signals at the same frequency as the given frequency synthesizer. However, these are further away from the given frequency synthesizer than the above-mentioned nearest neighbors (could be seen as next-nearest neighbors of the given frequency synthesizer), so they are more loosely inductively coupled to the given frequency synthesizer. In addition, if opposite phases are used as in FIG. 6, this helps reducing the coupled interference also from these next-nearest neighbors.

In the examples presented so far, two different LO frequencies $f_1$ and $f_2$ have been used. According to some embodiments, more than two frequencies may be used. This can help to further reduce coupled interference also from surrounding frequency synthesizers that are not the nearest neighbors of a given frequency synthesizer, such as the above-mentioned next-nearest neighbors. FIG. 7 illustrates an example where four different LO frequencies $f_1$, $f_2$, $f_3$, $f_4$ are used. It is readily seen from FIG. 7 that the pattern used there ensures that, for any given frequency synthesizer $40_{j,k}$, none of the adjacent other frequency synthesizers is controlled to generate an LO signal with the same frequency as the given frequency synthesizer; neither the adjacent frequency synthesizers in the same row or column, nor the adjacent frequency synthesizers on the same diagonal.

FIG. 7 is also another example where LO signals of the same frequency but opposite phases are used in the above-mentioned subsets in order for coupled interference to substantially cancel at the "victim" frequency synthesizer as described above. Consider for example the frequency synthesizers $40_{j,k+1}, 40_{j+2,k+1}$. They form a subset, that are both controlled to generate LO signals at the same frequency, namely $f_2$ and which are all nearest neighbors of a same other frequency synthesizer, namely $40_{j+1,k+1}$. The frequency synthesizer $40_{j,k+1}$, which is half of them, is controlled to generate an LO signal with a first phase $\phi_2$. The frequency synthesizer $40_{j+2,k+1}$, which is the other half of them, is controlled to generate an LO signal with a second phase $\overline{\phi_2}$, opposite to the first phase $\phi_2$. From the perspective of the "victim" frequency synthesizer $40_{j+1,k+1}$, a coupled interference from the "aggressor" frequency synthesizer $40_{j,k+1}$ is substantially canceled by a corresponding coupled interference, with opposite phase, from the other "aggressor" $40_{j+2,k+1}$ (and vice versa). Similar reasoning holds for other such subsets of frequency synthesizers.

In a regular multi-antenna transceiver, all transceivers use the same LO frequency. When different LO frequencies are used, as proposed herein, some type of compensation may be used. Some examples are discussed below with reference to FIG. 3. In the examples, it is assumed that the transmitted or received RF (radio frequency) signal is centered at $f_{RF}$, that the baseband signal is ideally centered at 0 Hz, and that the LO signal generated by the frequency synthesizer $40_{j,k}$ is $f_{LO}$. If direct conversion is used, a regular multi-antenna transceiver would have $f_{RF}=f_{LO}$. However, with different LO frequencies, at least some of the transceivers will have $f_{LO} \neq f_{RF}$ or $\Delta_f = F_{LO} - f_{RF} \neq 0$. In the Tx part $50_{j,k}$, this can be achieved by shifting the input signal to the mixer 52 by an amount of $-\Delta_f$ in frequency, e.g. by shifting the baseband signal such that it is centered at $-\Delta_f$. Then, the output signal from the mixer will be centered at $f_{RF}$ as desired. In the Rx part $60_{j,k}$, the output signal from the mixer 62 will be centered at $-\Delta_f$. Compensation can be achieved by shifting the output signal from the mixer an amount $\Delta_f$ in frequency, such that the baseband signal is centered at 0 Hz, as desired. In an OFDM (orthogonal frequency division multiplexing) scenario, such compensation can be obtained at a relatively low complexity. By selecting $\Delta_f$ as an integer multiple of the subcarrier spacing, the frequency shifts used for compensation correspond to an integer number of FFT (Fast Fourier Transform) bins, and can thus be performed in the frequency domain at the input of an IFFT (Inverse FFT) circuit (for the Tx part $50_{j,k}$) or at the output of an FFT circuit (for the Rx part $60_{j,k}$). For example, in some embodiments, the LO signal frequencies (e.g. $f_1$, $f_2$, $f_3$, $f_4$ with reference to embodiments discussed above) are selected to coincide with, or are aligned with, the sub-carrier frequency grid used in the reception and/or transmission of OFDM signals. In some embodiments, the LO signal frequencies are restricted to coincide with sub-carriers carrying a certain type of, or certain types of, information, such as reference signals, pilots, sync-signals, control data, and/or user data.

In a heterodyne transceiver, two mixing steps are used between RF and baseband (or vice versa), one in an RF mixer and another in an IF (intermediate frequency) mixer, using an RF LO signal and an IF LO signal, respectively. In such a heterodyne transceiver, no compensation is needed as long as it is made sure that the sum of the frequencies of the RF LO signal and the IF LO signal is $f_{RF}$ for all transceivers $20_{j,k}$.

The frequency synthesizers $40_{j,k}$ in said set may, for instance, be phase-locked loops (PLLs). PLLs, as such, are well known and therefore not described in any great level of detail herein. FIG. 8 shows a high-level block diagram of an embodiment where the frequency synthesizer $40_{j,k}$ is implemented as a PLL. It comprises a phase detector (or phase-frequency detector) 70, a filter 72, a controllable oscillator (CO) 74, such as a voltage-controlled oscillator (VCO) or a digitally controlled oscillator (DCO), configured to generate an oscillating output signal on an output 44, and a frequency divider 76. Said oscillating output signal may be the LO signal generated by the frequency synthesizer $40_{j,k}$, or a signal from which the LO signal is derived. The frequency divider 76 is configured to frequency divide the oscillating signal output from the CO 74 with a divisor. The phase detector is configured to receive a reference oscillation signal, e.g. from a crystal oscillator, on an input 42. Furthermore, it is configured to receive an output of the frequency divider 76 on another input. It is further configured to determine if the output from the frequency divider leads or lags the reference oscillation signal and provide an output signal indicative thereof. For example, it may an output with two output terminals, one labeled 'UP' and one labeled 'DOWN', and be configured to issue a pulse on the 'UP' terminal when the output from the frequency divider lags the reference oscillation signal and to issue a pulse on the 'DOWN' terminal when the output from the frequency divider leads the reference oscillation signal. The filter 72 is configured to filter the output from the phase detector 70 to provide a control signal to the controllable oscillator 74, to control the frequency thereof. The filter 72 may e.g. comprise a charge pump, controlled by the 'UP' and 'DOWN' pulses, followed by a circuit with low-pass characteristic. The loop structure drives the output from the frequency divider 76 to have the same frequency as the reference oscillation signal. If the frequency divider 76 is controllable, i.e. has a controllable divisor, the frequency of oscillating output signal from the CO 74 can be controlled by controlling the frequency divider 76. Accordingly, in some embodiments, the control circuit 30 is configured to control the controllable frequency divider 76. For example, the control circuit 30 may be configured to set the divisor of the frequency divider 76. Thereby the control circuit 30 can control the frequency of the LO signal generated by the frequency synthesizer $40_{j,k}$.

In some embodiments, the frequency divider 76 is a fractional N frequency divider. In such embodiments, a sequence of divisor values is used, that on average has a desired divisor value. Circuitry for generating such a sequence may, for instance, be included in the control circuit 30 or the frequency divider 76 itself.

In embodiments where the frequency synthesizers $40_{j,k}$ are PLLs, the inventors have found that particularly good isolation can be obtained if the LO signal frequencies (e.g.

$f_1, f_2, f_3, f_4$ with reference to embodiments discussed above) used are separated by more than the PLL open loop unity gain frequency bandwidth.

The control circuit 30 may take different form in different embodiments. For instance, in some embodiments, the control circuit 30 may be configured to autonomously select which frequency synthesizer $40_{j,k}$ should operate at which frequency (and possibly at which phase). In other embodiments, such selections may be made by a control entity external to the control circuit 30, possibly even external to the integrated circuit 10, and the control circuit 30 may be configured to act as an interface between the frequency synthesizers $40_{j,k}$ and said control entity, whereby the control circuit 30 acts under the control of said control entity to control the frequencies (and possibly phases) of the generated LO signals. For example, with reference to FIG. 8, the control circuit 30 may be configured to convey divisors, selected by said control entity, to the frequency dividers 76 of the different PLLs.

According to some embodiments, there is provided a method of controlling the integrated circuit 10 described above. The method may e.g. be executed by the control circuit 10. Alternatively, the method may be executed by the above-mentioned control entity, or by the control entity and the control circuit 30 together. An embodiment of the method is illustrated in FIG. 9, which includes the step 100 of controlling the set of frequency synthesizers such that nearest neighbors in the set of frequency synthesizers generate LO signals at different frequencies. Step 100 may include controlling the set of frequency synthesizers in any of the ways described above.

For example, as described above, step 100 may comprise, for a subset of the frequency synthesizers $40_{j,k+1}$, $40_{j+1,k}$, $40_{j+2,k+1}$, $40_{j+1,k+2}$ (FIG. 6) or $40_{j,k+1}$, $40_{j+2,k+1}$ (FIG. 7) which are controlled to generate LO signals at the same frequency $f_2$ and which are all nearest neighbors of a same other frequency synthesizer $40_{j+1,k+1}$:

controlling half of the frequency synthesizers $40_{j,k+1}$, $40_{j+1,k+2}$ (FIG. 6) or $40_{j,k+1}$ (FIG. 7) of the subset to generate LO signals with a first phase $\phi_2$, and controlling the other half of the frequency synthesizers $40_{j+1,k}$, $40_{j+2,k+1}$ (FIG. 6) $40_{j+2,k+1}$ (FIG. 7) of the subset to generate LO signals with a second phase $\overline{\phi_2}$, opposite to the first phase $\phi_2$.

As another example, step 100 may comprise:

controlling every other frequency synthesizer $40_{j,k}$ in the set of frequency synthesizers to generate an LO signal at a first frequency $f_1$, and controlling each of the other frequency synthesizers $40_{j,k}$ in the set of frequency synthesizers to generate an LO signal at a second frequency $f_2$, different from the first frequency $f_1$.

In the examples above, references to FIGS. 6 and 7, using specific reference signs and labels for frequencies and phases, are mere examples intended to simplify the understanding of the examples, but are not intended as limiting.

The present disclosure has been presented above with reference to specific embodiments. However, other embodiments than the above described are possible within the scope of the disclosure. The different features and steps of the embodiments may be combined in other combinations than those described.

The invention claimed is:

1. An integrated circuit comprising:
   a set of transceivers comprising a plurality of transceivers, all configured to transmit in the same transmit frequency band and receive in the same receive frequency band;
   a set of frequency synthesizers comprising a separate frequency synthesizer associated with each transceiver in the set of transceivers, each frequency synthesizer in the set being configured to generate a local-oscillator, LO, signal to its associated transceiver; and
   a control circuit configured to control the set of frequency synthesizers such that, nearest neighbors in the set of frequency synthesizers generating LO signals at different frequencies, every other frequency synthesizer being controlled to generate an LO signal at a first frequency, each of the other frequency synthesizers being controlled to generate an LO signal at a second frequency different from the first frequency.

2. The integrated circuit of claim 1, wherein the control circuit is configured to control the frequency synthesizers such that in a subset of the frequency synthesizers which are controlled to generate LO signals at the same frequency and which are all nearest neighbors of a same other frequency synthesizer, half of the frequency synthesizers are controlled to generate LO signals with a first phase and the other half of the frequency synthesizers are controlled to generate LO signals with a second phase opposite to the first phase.

3. The integrated circuit of claim 2, wherein each frequency synthesizer in the set is a phase-locked loop.

4. The integrated circuit of claim 3, wherein each phase-locked loop in the set has a controllable frequency divider in a feed-back path, and the control circuit is configured to control said controllable frequency divider.

5. The integrated circuit of claim 4, wherein each transceiver in the set of transceivers comprises a mixer configured to downconvert a received signal with the LO signal generated by the frequency synthesizer associated with the transceiver.

6. The integrated circuit of claim 2, wherein each transceiver in the set of transceivers comprises a mixer configured to downconvert a received signal with the LO signal generated by the frequency synthesizer associated with the transceiver.

7. The integrated circuit of claim 2, wherein each transceiver in the set of transceivers comprises a mixer configured to upconvert a signal to be transmitted with the LO signal generated by the frequency synthesizer associated with the transceiver.

8. The integrated circuit of claim 1, wherein each frequency synthesizer in the set is a phase-locked loop.

9. The integrated circuit of claim 8, wherein each phase-locked loop in the set has a controllable frequency divider in a feed-back path, and the control circuit is configured to control said controllable frequency divider.

10. The integrated circuit of claim 1, wherein each transceiver in the set of transceivers comprises a mixer configured to downconvert a received signal with the LO signal generated by the frequency synthesizer associated with the transceiver.

11. The integrated circuit of claim 1, wherein each transceiver in the set of transceivers comprises a mixer configured to upconvert a signal to be transmitted with the LO signal generated by the frequency synthesizer associated with the transceiver.

12. A communication apparatus comprising:
   an integrated circuit, the integrated circuit comprising:
      a set of transceivers comprising a plurality of transceivers, all configured to transmit in the same transmit frequency band and receive in the same receive frequency band;
      a set of frequency synthesizers comprising a separate frequency synthesizer associated with each transceiver in the set of transceivers, each frequency synthesizer in the set being configured to generate a local-oscillator, LO, signal to its associated transceiver; and a control circuit configured to control the set of frequency synthesizers, nearest neighbors in the set of frequency synthesizers generating LO signals at different frequencies, every other frequency synthesizer being controlled to generate an LO signal at a first frequency, each of the other frequency synthesizers being controlled to generate an LO signal at a second frequency different from the first frequency; and a multi-antenna arrangement comprising a separate antenna element associated with and connected to each transceiver in the set of transceivers.

13. The communication apparatus of claim 12, wherein the communication apparatus is configured to perform beamforming communication via the multi-antenna arrangement.

14. The communication apparatus of claim 12, wherein the communication apparatus is a radio base station for a cellular communications system.

15. The communication apparatus of claim 12, wherein the communication apparatus is a wireless communication device for a cellular communications system.

16. A method of controlling an integrated circuit, the integrated circuit comprising:

a set of transceivers comprising a plurality of transceivers, all configured to transmit in the same transmit frequency band and receive in the same receive frequency band; and a set of frequency synthesizers comprising a separate frequency synthesizer associated with each transceiver in the set of transceivers, each frequency synthesizer in the set being configured to generate a local-oscillator, LO, signal to its associated transceiver;

the method comprising:

controlling the set of frequency synthesizers, nearest neighbors in the set of frequency synthesizers generating LO signals at different frequencies, controlling the set of frequency synthesizers comprises:

controlling every other frequency synthesizer in the set of frequency synthesizers to generate an LO signal at a first frequency; and controlling each of the other frequency synthesizers in the set of frequency synthesizers to generate an LO signal at a second frequency different from the first frequency.

17. The method of claim 16, wherein controlling the set of frequency synthesizers comprises, for a subset of the frequency synthesizers which are controlled to generate LO signals at the same frequency and which are all nearest neighbors of a same other frequency synthesizer:

controlling half of the frequency synthesizers of the subset to generate LO signals with a first phase; and controlling the other half of the frequency synthesizers of the subset to generate LO signals with a second phase, opposite to the first phase.

* * * * *